(12) United States Patent
Bergstrom et al.

(10) Patent No.: US 9,785,287 B2
(45) Date of Patent: Oct. 10, 2017

(54) OPTICAL COUPLING IN TOUCH-SENSING SYSTEMS

(71) Applicant: FlatFrog Laboratories AB, Lund (SE)

(72) Inventors: Hakan Bergstrom, Torna-Hallestad (SE); Ola Wassvik, Brosarp (SE); Thomas Craven-Bartle, Sodra Sandby (SE); Olov Von Hofsten, Arsta (SE); Bjorn Le Normand, Stockholm (SE); Leif Ek, Bandhagen (SE)

(73) Assignee: FLATFROG LABORATORIES AB, Lund (SE)

( * ) Notice: Subject to any disclaimer, the term of this patent is extended or adjusted under 35 U.S.C. 154(b) by 2 days.

(21) Appl. No.: 14/652,735

(22) PCT Filed: Dec. 17, 2013

(86) PCT No.: PCT/SE2013/051535
§ 371 (c)(1),
(2) Date: Jun. 16, 2015

(87) PCT Pub. No.: WO2014/098743
PCT Pub. Date: Jun. 26, 2014

(65) Prior Publication Data
US 2015/0331544 A1     Nov. 19, 2015

Related U.S. Application Data

(60) Provisional application No. 61/738,044, filed on Dec. 17, 2012.

(30) Foreign Application Priority Data

Dec. 17, 2012 (SE) .................................... 1251436

(51) Int. Cl.
G06F 3/042 (2006.01)
G06F 3/041 (2006.01)
F21V 8/00 (2006.01)

(52) U.S. Cl.
CPC ......... G06F 3/0421 (2013.01); G02B 6/0013 (2013.01); G02B 6/0023 (2013.01);
(Continued)

(58) Field of Classification Search
CPC ......... G06F 2203/04109; G06F 3/0421; G06F 3/0412; G06F 3/042; G02B 6/005;
(Continued)

(56) References Cited

U.S. PATENT DOCUMENTS 4,484,179 A    11/1984   Kasday
7,432,893 B2    10/2008   Ma et al.
(Continued)

FOREIGN PATENT DOCUMENTS

WO   WO-2009/048365 A1   4/2009
WO   WO-2009/077962 A2   6/2009
(Continued)

OTHER PUBLICATIONS

International Search Report and Written Opinion dated May 14, 2015 issued in corresponding International Application No. PCT/SE2013/051535.

*Primary Examiner* — Sanjiv D Patel
(74) *Attorney, Agent, or Firm* — Harness, Dickey & Pierce, PLC

(57) ABSTRACT

A touch-sensitive aparatus operates by light frustration (FTIR) and comprises a light transmissive panel (1) with a front surface (5) and a rear surface (6). Light emitters (2) are optically coupled to the panel (1) at entry ports along a periphery region of the panel (1), and light detectors (3) are optically coupled to the panel (1) at exit ports along the (Continued)

periphery region for detecting light transmitted inside the panel (1). At least one optical sheet (20) is provided on the rear surface (6) in the periphery region. In an outcoupling installation, the light detectors (3) are arranged at the respective optical sheet (20) to receive, on a respective light-sensitive surface (3A); light from the optical sheet (20), and each light detector (3) is arranged with the light-sensitive surface (3A) essentially perpendicular to the rear surface (6). In an incoupling installation, each light emitter (2) is arranged at the respective optical sheet (20) to emit diverging light with a main direction that is essentially parallel to the rear surface (6) such that a portion of the diverging light impinges on the optical sheet (20) so as to define a respective entry port.

23 Claims, 6 Drawing Sheets

(52) U.S. Cl.
CPC ......... *G02B 6/0088* (2013.01); *G06F 3/0416* (2013.01); *G06F 3/0428* (2013.01); *G06F 2203/04103* (2013.01); *G06F 2203/04109* (2013.01)

(58) Field of Classification Search
CPC .. G02B 6/0055; G02B 6/0091; G02B 6/0023; G02B 6/0031; G02B 6/0068; G02B 6/0028; G02B 6/0076; G02B 6/241
USPC ........................................................ 362/606
See application file for complete search history.

(56) References Cited

U.S. PATENT DOCUMENTS

| | | | | |
|---|---|---|---|---|
| 8,686,974 | B2 * | 4/2014 | Christiansson | G06F 3/0421 178/18.09 |
| 8,872,801 | B2 * | 10/2014 | Bergstrom | G06F 3/0421 345/173 |
| 9,323,396 | B2 * | 4/2016 | Han | G06F 3/0425 |
| 2008/0007540 | A1 * | 1/2008 | Ostergaard | G06F 3/0421 345/176 |
| 2009/0040786 | A1 * | 2/2009 | Mori | G02B 6/0021 362/616 |
| 2010/0078545 | A1 * | 4/2010 | Leong | G06F 3/042 250/221 |
| 2010/0193259 | A1 | 8/2010 | Wassvik | |
| 2011/0227874 | A1 * | 9/2011 | Fahraeus | G06F 3/0421 345/175 |
| 2012/0153134 | A1 * | 6/2012 | Bergstrom | G06F 3/042 250/221 |
| 2013/0021302 | A1 * | 1/2013 | Drumm | G06F 3/0421 345/175 |
| 2013/0082980 | A1 * | 4/2013 | Gruhlke | G02F 1/13338 345/175 |
| 2013/0135258 | A1 * | 5/2013 | King | G06F 3/0421 345/175 |
| 2013/0135259 | A1 | 5/2013 | King et al. | |
| 2013/0300716 | A1 | 11/2013 | Craven-Bartle et al. | |

FOREIGN PATENT DOCUMENTS

| | | |
|---|---|---|
| WO | WO-2010/015408 A1 | 2/2010 |
| WO | WO-2010/064983 A2 | 6/2010 |
| WO | WO-2011/049511 A1 | 4/2011 |
| WO | WO-2011/139213 A1 | 11/2011 |
| WO | WO-2012/050510 A1 | 4/2012 |
| WO | WO-2012/105893 A1 | 8/2012 |
| WO | WO-2013/062471 A2 | 5/2013 |

* cited by examiner

OPTICAL COUPLING IN TOUCH-SENSING SYSTEMS

CROSS-REFERENCE TO RELATED APPLICATIONS

This application is a national phase under 35 U.S.C. §371 of PCT International Application No. PCT/SE2013/051535 which has an International filing date of Dec. 17, 2013, which claims priority to Sweden patent application number SE 1251436-0 filed Dec. 17, 2012 and U.S. provisional patent application number 61/738,044 filed Dec. 17, 2012.

TECHNICAL FIELD

The present invention relates to FTIR-based touch-sensing systems that operate by propagating diverging beams of light by internal reflections inside a thin light transmissive panel, and in particular to optical solutions for measuring a property of light on different propagation paths across the light transmissive panel.

BACKGROUND ART

FTIR-based touch-sensing systems ("FTIR systems") are optical touch systems that use projection measurements for light that propagates on a plurality of propagation paths inside a light transmissive panel. The projection measurements thus quantify a property, e.g. power, of the light on the individual propagation paths, when the light has passed a touch-sensitive region on the panel. The light propagates by total internal reflection (TIR) inside the panel such that an object that touches the touch-sensitive region causes the propagating light on one or more propagation paths to be attenuated or "frustrated" (FTIR, Frustrated Total Internal Reflection). The projection measurements may be processed to identify the location of touches on the touch-sensitive region, e.g. by triangulation or by advanced image reconstruction techniques.

To achieve a dense grid of propagation paths, the light may be injected into the panel as diverging beams of light, which thus expand in the plane of the panel as they propagate inside the panel from a respective entry port on the panel. By measuring the property of each beam of light at a plurality of spaced apart exit ports on the panel, each beam forms a plurality of propagation paths between the entry port and a number of the exit ports. Such an FTIR system is disclosed in U.S. Pat. No. 7,432,893, which uses revolved prisms to couple diverging beams of light into the panel, and photodetectors directly attached to the panel to detect the propagating light.

In touch-sensitive devices, there is a general trend to avoid attaching components to the front surface. These components may form a frame around the touch-sensitive region and thereby reduce the ratio of the active area (the surface area that is available for touch interaction) to the total area of the touch-sensitive device. Furthermore, if the components protrude from the front surface of the panel, it may be necessary to provide a bezel at the perimeter of the panel to protect and hide the components and possibly any wiring connected to the components. Given the nature of user interaction with touch-sensitive devices, such a bezel may disrupt the user experience and even prevent certain types of interaction. The bezel may also cause dirt and other contaminants to accumulate in the area where the bezel joins the panel. To overcome this problem, it is desirable to design touch systems for flush mount of the panel in the supporting frame of the touch-sensitive device, i.e. such that the front surface of the panel is level with the surrounding frame material. This is also known as "edge-to-edge".

It is thus desirable to achieve a touch-sensing system that is compact and has a flat front surface, without bezel or other projecting structures, while reducing the impact of ambient light.

Aforesaid U.S. Pat. No. 7,432,893 proposes to suppress the impact of ambient light by attaching the photodetectors to the front surface, such that the photodetectors face away from the ambient light that enters the panel through the front surface. Clearly, such an FTIR system will require a significant bezel to hide and protect the photodetectors and the associated wiring. U.S. Pat. No. 7,432,893 also proposes using large revolved prisms, e.g. attached to the rear surface of the panel, for coupling light into the panel. This adds considerable weight and thickness to the touch system.

The prior art also comprises WO2012/105893 which proposes using a sheet-like microstructured element, e.g. a tape of light transmissive material, on the front or rear surface of panel for coupling light into the panel of an FTIR system. WO2012/105893 also notes that a similar sheet-like microstructured element may be used for coupling light out of the panel. The use of sheet-like microstructured elements may thus serve to reduce the weight and thickness of an FTIR system. However, WO2012/105893 provides no solution to the conflict between providing a flat front surface and suppressing the impact of ambient light that enters the panel through the front surface.

SUMMARY

It is an objective of the invention to at least partly overcome one or more of the above-identified limitations of the prior art.

Another objective is to provide a touch system that is compact and has a flat front surface, while reducing the impact of ambient light.

One or more of these objectives, as well as further objectives that may appear from the description below, are at least partly achieved by means of touch-sensitive apparatuses according to the independent claim, embodiments thereof being defined by the dependent claims.

A first aspect of the invention is a touch-sensitive apparatus, which comprises: a light transmissive panel that defines a front surface and an opposite, rear surface, the light transmissive panel comprising a center region and a periphery region adjacent to the center region; light emitters which are optically coupled to the panel at entry ports along the periphery region so as to generate individual beams of light that diverge in the plane of the panel while they propagate inside the panel, from the entry ports and into the center region, by internal reflections between the front and rear surfaces; and light detectors which are optically coupled to the panel for detecting light transmitted inside the panel at exit ports along the periphery region. In the apparatus, at least one sheet-like optical element is provided on the rear surface in the periphery region; the light detectors are arranged at said at least one sheet-like optical element to receive, on a respective light-sensitive surface, light from the at least one sheet-like optical element; and each of the light detectors is arranged with the light-sensitive surface essentially perpendicular to the rear surface.

In one embodiment, each of the light detectors is displaced from the sheet-like optical element in a direction away from the center region, so as to be arranged without overlap between the sheet-like optical element and the light detector.

In one embodiment, each of the light detectors is arranged beneath the panel, and wherein a light shield is arranged intermediate the rear surface and each of the light detectors in the periphery region, the light shield being configured to be light blocking in at least the wavelength range of the beams of light. The light shield may be provided on the rear surface adjacent to said at least one sheet-like optical element in the periphery region.

In one embodiment, the beams of light comprise light in an infrared wavelength region, and wherein the apparatus further comprises a visibility shield which is arranged intermediate the rear surface and said at least one sheet-like optical element, the visibility shield being configured to block light that is visible to the human eye and to transmit light in the infrared wavelength region.

In one embodiment, said at least one sheet-like optical element comprises micro-structures that define an imaging optical element configured to transmit, and possibly re-direct, light that impinges thereon from inside the panel. In one implementation said at least one sheet-like optical element comprises a diffractive layer with microstructures of varying refractive indices. In a further implementation, which may be combined with the first implementation, an angular filter is provided intermediate the rear surface and the sheet-like optical element.

In an alternative embodiment, said at least one sheet-like optical element is configured as a non-imaging component configured to diffusely transmit light that impinges thereon from inside the panel. In one implementation, said at least one sheet-like optical element comprises at least one elongate strip of diffusively transmitting material. In another implementation, said at least one sheet-like optical element comprises a plurality of spatially separated dots of diffusively transmitting material, wherein said light detectors are arranged at a respective dot.

In one embodiment, said at least one sheet-like optical element is configured to exhibit at least 50% diffuse emission, and preferably at least 90% diffuse emission, and wherein said at least one sheet-like optical element is configured to exhibit at least 50% transmission of said diffuse emission.

In one embodiment, each of the light detectors is arranged to receive light that has propagated by total internal reflection across the center region from a plurality of entry ports, and wherein each of the light detectors is arranged to receive the light from a portion of said at least one sheet-like optical element, said portion having an extent on the light transmissive panel, in directions towards the plurality of entry ports, of at least $2 \cdot t \cdot \tan(\theta_{min})$, wherein t is the distance between the front and rear surfaces, and $\theta_{min}$ is an angle larger than or equal to the critical angle $\theta_c$ of the panel.

In one embodiment, the light emitters are arranged to emit light onto said at least one sheet-like optical element so as to define the entry ports and generate, by diffuse transmission, the beams of light that propagate inside the panel. Each of the light emitters may be configured to emit diverging light with a main direction that is essentially parallel to the rear surface. In one implementation, each of the light emitters is arranged to provide light for propagation by total internal reflection across the center region to a plurality of exit ports, and wherein each of the light emitters is arranged to illuminate a portion of said at least one sheet-like optical element, said portion having an extent on the light transmissive panel, in directions towards the plurality of exit ports, of at most $2 \cdot t \cdot \tan(\theta_{min})$, wherein t is the distance between the front and rear surfaces, and $\theta_{min}$ is an angle larger than or equal to the critical angle $\theta_c$ of the panel.

In one embodiment, said at least one sheet-like optical element defines a continuous frame in surrounding relationship to the center region.

In one embodiment, the light detectors are side-detecting components that are mounted on a mounting surface of one or more printed-circuit boards that are arranged with the mounting surface facing and extending parallel to the rear surface of the panel.

A second aspect of the invention is a touch-sensitive apparatus, which comprises: a light transmissive panel that defines a front surface and an opposite, rear surface, the light transmissive panel comprising a center region and a periphery region adjacent to the center region; light emitters which are optically coupled to the panel at entry ports along the periphery region so as to generate individual beams of light that diverge in the plane of the panel while they propagate inside the panel, from the entry ports and into the center region, by internal reflections between the front and rear surfaces; and light detectors which are optically coupled to the panel for detecting light transmitted inside the panel at exit ports along the periphery region. In the apparatus, at least one sheet-like optical element is provided on the rear surface in the periphery region; and each of the light emitters is arranged at said at least one sheet-like optical element to emit diverging light with a main direction that is essentially parallel to the rear surface such that a portion of the diverging light impinges on said at least one sheet-like optical element so as to define a respective entry port.

In one embodiment, said at least one sheet-like optical element comprises microstructures that define an imaging optical element configured to transmit, and possibly re-direct, said portion of the diverging light that impinges thereon.

In an alternative embodiment, said at least one sheet-like optical element is configured as a non-imaging component configured to diffusely transmit said portion of the diverging light that impinges thereon.

Any one of the above-identified embodiments of the first aspect may be adapted and implemented as an embodiment of the second aspect.

Yet another aspect of the invention is a touch-sensitive apparatus, comprising: a light transmissive panel that defines a front surface and an opposite, rear surface, the light transmissive panel comprising a center region and a periphery region adjacent to the center region; light emitters which are optically coupled to the panel at entry ports along the periphery region so as to generate individual beams of light that diverge in the plane of the panel while they propagate inside the panel, from the entry ports and into the center region, by internal reflections between the front and rear surfaces; and light detectors which are optically coupled to the panel for detecting light transmitted inside the panel at exit ports along the periphery region; wherein each of the light detectors is arranged with a respective light-sensitive surface essentially perpendicular to the rear surface; and wherein a flexible, non-shaped, light transmissive material is arranged between and in contact with the rear surface, or one or more layers thereon, and the respective light-sensitive surface such that a portion of the light transmitted inside the panel is transmitted via the flexible, non-shaped, light transmissive material onto the light-sensitive surface.

A still further aspect is a touch-sensitive apparatus, comprising: a light transmissive panel that defines a front surface and an opposite, rear surface, the light transmissive panel comprising a center region and a periphery region adjacent to the center region; light emitters which are optically coupled to the panel at entry ports along the periphery region so as to generate individual beams of light that diverge in the plane of the panel while they propagate inside the panel, from the entry ports and into the center region, by internal reflections between the front and rear surfaces; and light detectors which are optically coupled to the panel for detecting light transmitted inside the panel at exit ports along the periphery region; wherein a flexible, non-shaped, light transmissive material is arranged between and in contact with the rear surface, or one or more layers thereon, and a light-emitting surface of the respective light emitter; and wherein each of the light emitters is arranged to emit, into the flexible, non-shaped, light transmissive material, diverging light with a main direction that is essentially parallel to the rear surface such that a portion of the diverging light impinges on the rear surface so as to define a respective entry port.

In one embodiment, the flexible, non-shaped, light emitting material comprises one of an adhesive, a gel and a silicon compound.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
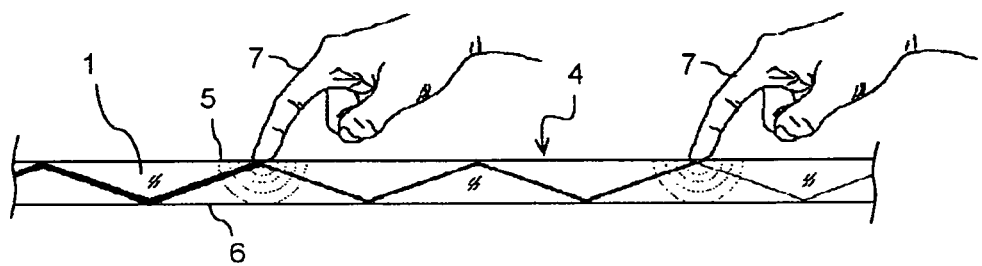
FIG. 1 is a section view of a light transmissive panel to illustrate the principle of using FTIR for touch detection.

The following description is focused on light coupling structures for use in an FTIR-based touch-sensitive apparatus. Throughout the description, the same reference numerals are used to identify corresponding elements.

FIG. 1 illustrates the concept of touch detection based on attenuation of propagating light, commonly denoted FTIR (Frustrated Total Internal Reflection). According to this concept, light is transmitted inside a panel 1 along a plurality of well-defined propagation paths. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, and the top surface 5 allows the propagating light to interact with touching objects 7 and thereby defines the touch surface 4. The interaction is enabled by injecting the light into the panel 1 such that the light is reflected by total internal reflection (TIR) in the top or front surface 5 as it propagates through the panel 1. The light may be reflected by TIR in the bottom or rear surface 6 or against a reflective coating thereon. It is also conceivable that the propagation channel is spaced from the bottom surface 6, e.g. if the panel comprises multiple layers of different materials. The panel 1 may thus be made of any solid material (or combination of materials) that transmits a sufficient amount of light in the relevant wavelength range to permit a sensible measurement of transmitted energy. Such material includes glass, poly (methyl methacrylate) (PMMA) and polycarbonates (PC). The panel 1 may be designed to be overlaid on or integrated into a display device or monitor (not shown).

As shown in FIG. 1, an object 7 that is brought into close vicinity of, or in contact with, the touch surface 4 may interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local attenuation or "frustration" of the total internal reflection, which leads to a decrease in the energy (or equivalently, the power or intensity) of the transmitted light, as indicated by the thinned lines downstream of the touching objects 7 in FIG. 1.

Figure 2:
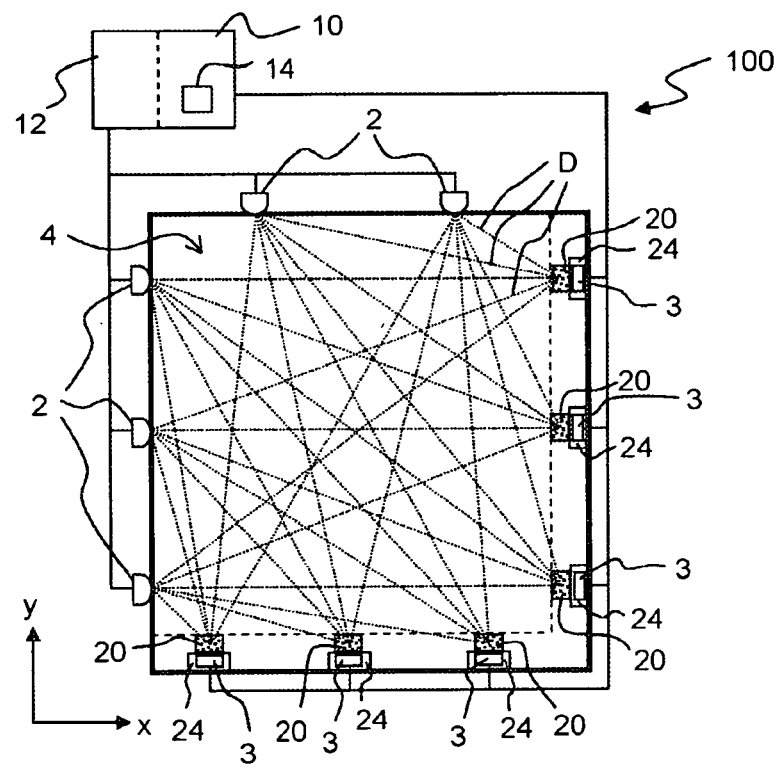
FIG. 2 is a top plan view of an FTIR-based touch-sensitive apparatus according to an embodiment.

FIG. 2 illustrates an example embodiment of a touch-sensitive apparatus 100 that is based on the concept of FTIR. Emitters 2 are distributed along the perimeter of the touch surface 4 to project light through an edge surface of the panel 1 such that at least part of the light is captured inside the panel 1 for propagation by internal reflections in the propagation channel. Detectors 3 are distributed along the perimeter of the touch surface 4, beneath the panel 1, and are optically coupled to the panel 1 so as to receive part of the propagating light. The light from each emitter 2 will form a diverging beam of light inside the panel, i.e. a beam that diverges in the plane of the panel 1 as it propagates in the propagation channel. Thereby, the light from each emitter propagates to a plurality of detectors 3 on a plurality of light propagation paths D, as shown in FIG. 2. Even if the light propagation paths D correspond to light that propagates by internal reflections inside the panel 1, the light propagation paths D may conceptually be represented as "detection lines" that extend across the touch surface 4 between pairs of emitters 2 and detectors 3, as indicated by dotted lines in FIG. 2. Thus, the detection lines correspond to a projection of the propagation paths onto the touch surface 4. Thereby, the emitters 2 and detectors 3 collectively define a grid of detection lines ("detection grid") on the touch surface 4, as seen in a top plan view. It is appreciated that FIG. 2 is an example, and that a (significantly) larger number of emitters 2 and/or detectors 3 may be included in the apparatus 100. Also, the distribution of emitters 2 and detectors 3 may differ.

Embodiments of the invention relate to optical coupling structures for defining the entry ports where the light from the emitters 2 enters the panel 1 and the exit ports where the propagating light leaves the panel 2 for receipt by the detectors 3.

As used herein, the emitter 2 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 2 may also be formed by the end of an optical fiber. The emitters 2 may generate light in any wavelength range. The following examples presume that the light is generated in the infrared (IR), i.e. at wavelengths above about 750 nm. Analogously, the detector 3 may be any device capable of converting light (in the same wavelength range) into an electrical signal, such as a photo-detector, a CCD device, a CMOS device, etc.

The detectors 3 collectively provide an output signal, which is received and sampled by a signal processor 10. The output signal contains a number of sub-signals, also denoted "projection signals", each representing the energy of light received by a certain light detector 3 from a certain light emitter 2. Depending on implementation, the signal processor 10 may need to process the output signal for separation of the individual projection signals. The projection signals represent the energy, intensity or power of light received by the detectors 3 on the individual detection lines D. Whenever an object touches a detection line, the received energy on this detection line is decreased or "attenuated".

Figure 3:
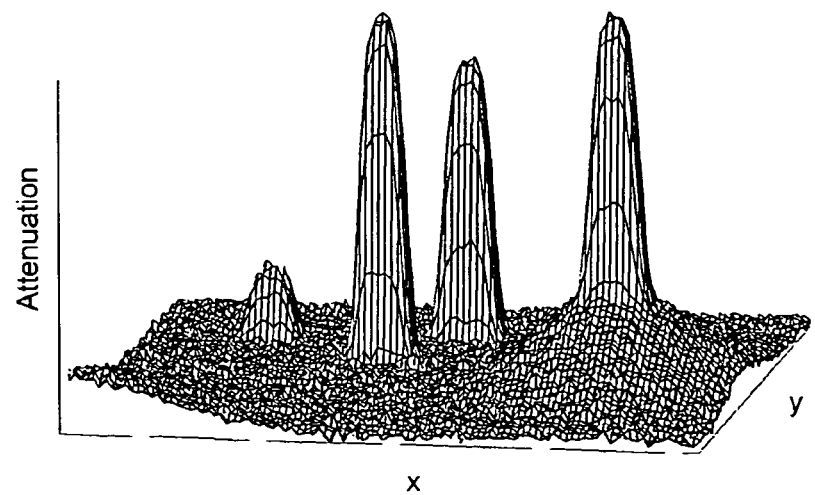
FIG. 3 is a 3D plot of an attenuation pattern generated based on output signals from an FTIR-based touch-sensitive apparatus.

The signal processor 10 may be configured to process the projection signals so as to determine a property of the touching objects, such as a position (e.g. in the x,y coordinate system shown in FIG. 2), a shape, or an area. This determination may involve a straight-forward triangulation based on the attenuated detection lines, e.g. as disclosed in U.S. Pat. No. 7,432,893 and WO2010/015408. or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 3, where the peaks of increased attenuation represent touching objects. The attenuation pattern may be further processed by the signal processor 10 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962. WO2011/049511. WO2011/139213. WO2012/050510. and WO2013/062471. all of which are incorporated herein by reference.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14, such as a CPU.

Figure 9A:
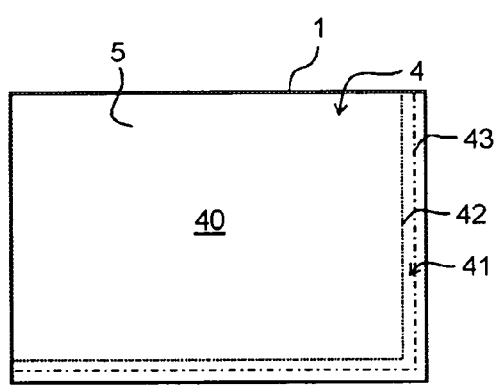
FIGS. 9A-9B are top plan views of exemplifying distributions of regions on a touch-sensitive apparatus.
Figure 9B:
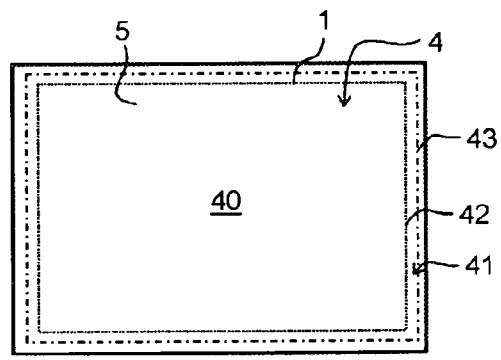

Reference is now made to FIGS. 9A-9B which illustrate the location of certain regions on the panel 1. Within its extent, the panel 1 has a center region 40 and an adjacent periphery region 41, where the periphery region 41 contains optical coupling structures for coupling light into and out of the panel 1. In FIGS. 9A-9B, the border between the center and periphery regions 40, 41 is indicated by dotted line 42. As indicated above, the panel 1 defines a touch surface 4, which enables touching objects to interact with the propagating light. The touch surface 4 may, but need not, coincide with the center region 40. In FIGS. 9A-9B, the touch surface 4 extends into the periphery region 41 to a touch surface border 43.

FIG. 9A is a generalization of FIG. 2, where the periphery region 41 extends along two sides of the panel 1. In the example of FIG. 2, two sides of the panel 1 contains outcoupling structures in a periphery region (indicated by dashed lines), whereas two sides are free of incoupling structures within the extent of the panel 1 since (as suggested in FIG. 2) light is coupled into the panel 1 via the edge surface that connects the front and rear surfaces 5, 6. FIG. 9B shows an alternative configuration, in which the periphery region 41 completely surrounds the center region 40.

1. Outcoupling Structures

Figure 4A:
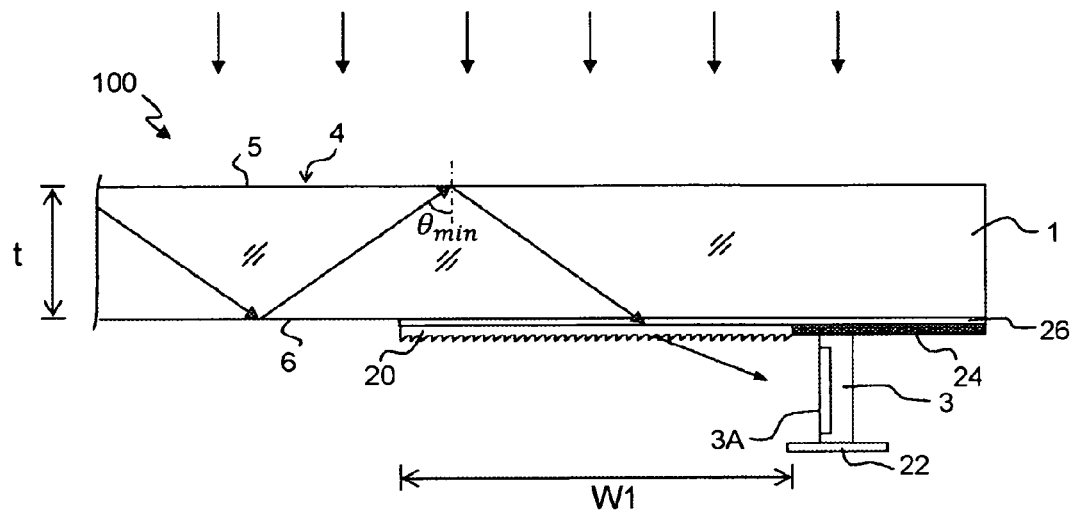
FIGS. 4A-4C are section views of light outcoupling structures according to first and second embodiments.

FIG. 4A shows a first embodiment of an outcoupling structure, shown in cross-section taken along any one of the detection lines D in FIG. 2. An optical sheet ("outcoupling sheet") 20 is attached to the rear side 6 of the panel 1, in the periphery region of the panel 1. The outcoupling sheet 20 is micro-structured on the side facing away from the panel 1. As used herein, a "microstructured surface" contains surface structures having at least one dimension in the range of 0.1-1000 µm. The microstructures are designed to transmit light from the panel 1 onto the detector 3, via an air space. The combination of the sheet 20 and the detector 3 defines an exit port on the panel 1. The microstructures collectively define an imaging component which is designed to direct light that impinges on the sheet 20 at given angles of incidence, onto the detector 3. The microstructures may be arranged to merely transmit the light onto the detector 3, or to refract (redirect or deflect) the light onto the detector 3, as shown. Although not shown in FIG. 4A, the distribution and structure (shape, type, etc) of the microstructures may be varied across the sheet 20, e.g. to redirect, onto the detector 3, light that impinges on the sheet 20 within a larger range of angles of incidence, or to cause the sheet 20 to generate an increasing deflection of the transmitted light towards the detector 3 with increasing distance from the detector 3. The distribution and structure of the microstructures may also be varied to achieve a desired outcoupling efficiency for the different detection lines that reach each detector 3 (cf. FIG. 2). The sheet 20 may e.g. be of the type disclosed in aforesaid WO2012/105893, which is incorporated herein by reference. Examples of microstructures include prismatic elements (microprims) and lenticular elements (microlenses). Alternatively the microstructures may be diffractive structures of varying refractive indices, so that the outcoupling sheet 20 is e.g. a grating comprised of varying refractive indices. Since the sheet 20 is arranged on the rear surface 6, it is possible to keep the front surface 5 free of additional layers and components. Furthermore, the sheet 20 allows light to be coupled out of the panel 1 irrespective of the quality and design of the edge surface.

The detector 3 has a confined light-sensing surface 3A which is responsive to light (photons). In the embodiment of FIG. 4A, the detector 3 is arranged with its light-sensing surface 3A essentially perpendicular to the main extent of the panel 1. The detector 3 may be side-looking when mounted on a PCB 22, as shown, which allows the PCB 22 to be installed with its flat mounting surface facing the rear surface 6 of the panel 1. This enables a compact design of the apparatus 100, especially if the PCB 22 is wide. In an alternative, not shown, a top-looking detector 3 may be mounted to a PCB 22 that is arranged at right angles to the rear surface 6.

The perpendicular arrangement of the surface 3A reduces the impact of ambient light, i.e. light emanating from the surroundings of the apparatus 100. Ambient light typically contains daylight and/or light from artificial light sources. Such ambient light includes IR light which, if it falls on the surface 3A, will interfere with the detection of the propagating IR light inside the panel 1. Since ambient light generally has its origin far from the apparatus 100, the ambient light generally falls at right angles onto the front surface 5, as indicated by parallel arrows at the top of FIG. 4A. Other directions of the ambient light are certainly possible, but the ambient light is unlikely to impinge on the sheet 20 in the same direction as the light that propagates by TIR inside the panel. It is realized that by arranging the light-sensing surface 3A generally parallel to the main direction of ambient light, any ambient light that falls on and passes the sheet 20 is less likely to impinge on the light-sensing surface 3A. As used herein, "essentially perpendicular" is intended to include deviations of about ±20° or less from perpendicular.

To ensure that the full extent of the sheet 20 is used for coupling propagating IR light onto the surface 3A, the detector 3 is arranged without overlap with the sheet 20.

To further shield the light-sensing surface 3A from ambient light, an ambient filter ("light shield") 24 is applied to the rear surface 6 next to the sheet 20 in the periphery region. In FIG. 4A, the ambient filter 24 extends from the outer edge of the sheet 20 to the edge of the panel 1. As used herein, "the outer edge" and "the inner edge" indicate the edges located farthest from and closest to, respectively, the center region on the panel. The ambient filter 24 is configured to at least block IR light, and it may also be blocking to visible light. It may be preferable to displace the detector 3 from the outer edge of the outcoupling sheet 20, towards the edge of the panel 1, as shown, so that the ambient filter 24 projects beyond the surface 3A.

In FIG. 4A, the apparatus 100 further comprises a visibility filter 26 (not shown in FIG. 2), which is arranged to hide the sheet 20 and the internal structure of the apparatus 100 from view through the front surface 5. The visibility filter 26 is non-transmissive (opaque) to visible light and transmissive to IR light, and preferably only transmissive to IR light in the wavelength region of the emitted light. In FIG. 4A, the visibility filter 26 extends from the inner edge of the sheet 20 to the edge of the panel 1, although the visibility filter 26 may extend further beyond the sheet 20 towards the center region. If the ambient filter 24 is opaque to visible light, the visibility filter 26 may be omitted above the ambient filter 24. In FIG. 4A, the visibility filter 26 is arranged beneath the panel 1, intermediate the rear surface 6 and the sheet 20 (and intermediate the rear surface 6 and the ambient filter 24). This enables the front surface 5 to be perfectly flat and free of projecting elements. In a variant, not shown, one or both filters 24, 26 are applied to the front surface 5.

The filters 24, 26 may be implemented as a coating or film, in one or more layers.

The outcoupling sheet 20 may be implemented as a coating, film or other element which is applied to the rear surface 6, either directly or indirectly (e.g. onto the visibility filter 26, if present). In a variant, the outcoupling sheet 20 is integrated into the rear surface 6, e.g. by etching, embossing, molding, abrasive blasting, etc, and preferably (but not necessarily) the filters 24, 26 are applied to the front surface 5.

It is to be understood that the width W1 (in the direction of the respective detection line) of the sheet 20 may be optimized with respect to the range of angles of the propagating light that should be directed onto the light-sensing surface 3A, as well as the size and placement of the light-sensing surface 3A. Typically, the width W1 is approximately equal to, or larger than, the "minimum design distance" between consecutive bounces in the rear surface 6, as described below in relation to FIG. 6A.

Figure 4B:
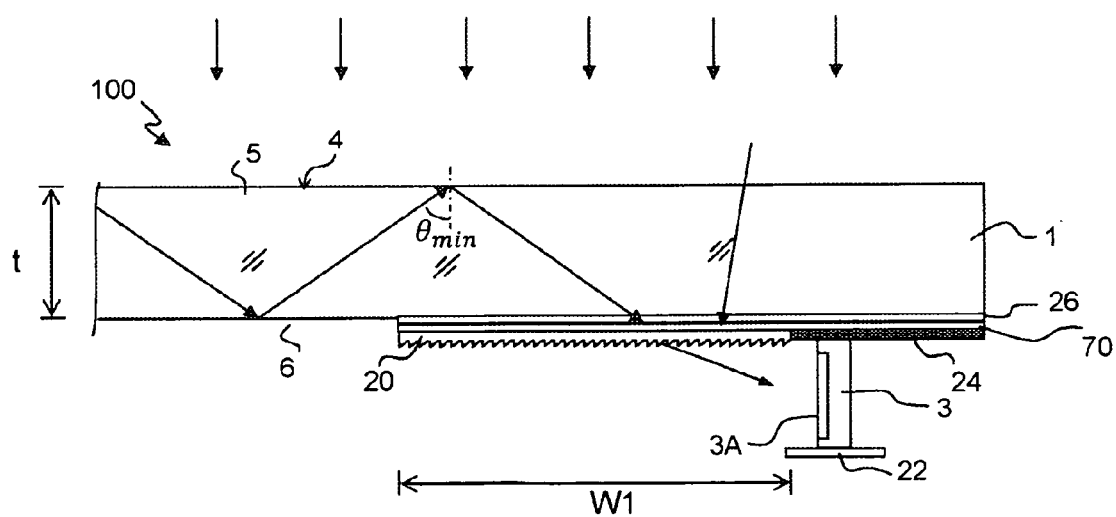

If not all wavelengths are blocked by the visibility filters 24 and/or the ambient filter 26, an angular filter may be used. The angular filter may be used to stop ambient light of small angles from reaching the outcoupling sheet 20, where it might otherwise be reflected by total internal reflection in the microstructures and be propagated towards the light-sensitive surface 3A. FIG. 4B shows a variant of FIG. 4A, wherein the outcoupling structure also comprises an angular filter 70. The angular filter 70 is designed to only be transmissive to light within a given angular range, i.e. for light that impinges on the angular filter 70 at certain angles of incidence to the normal of the filter 70. The angular filter 70 may be designed as a dielectric or polymer multilayer structure of at least two different materials, similar to an interference filter. The angular filter 70 is attached to the rear of the visibility filter 26, and is intermediate the visibility filter 26 and the outcoupling sheet 20. Embodiments of such an angular filter is further disclosed in Applicant's US provisional application US61/740093. which was filed on 20 Dec. 2012 and is incorporated herein in its entirety by this reference.

Figure 4C:
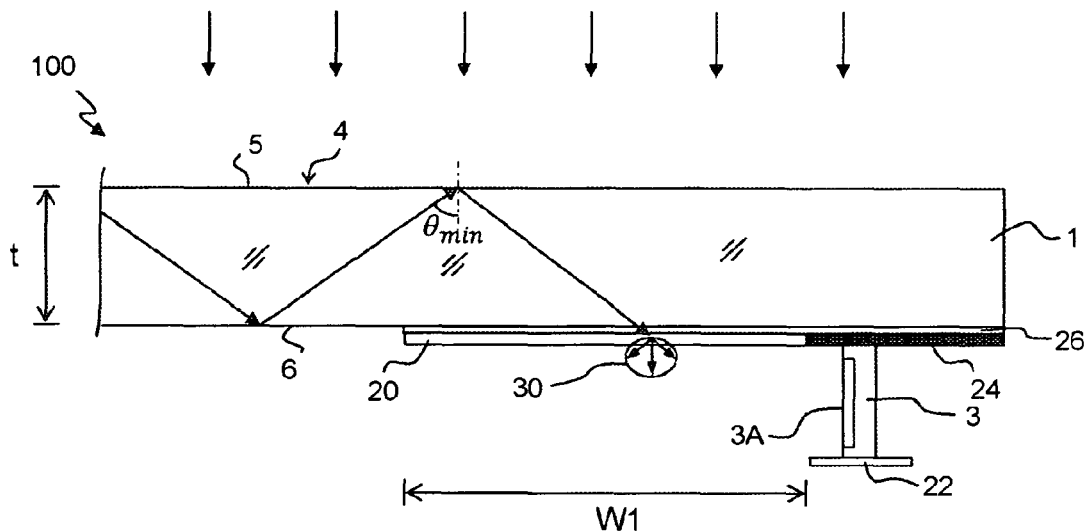

FIG. 4C shows a second embodiment of an outcoupling structure. The second embodiment differs from the first embodiment by the type and function of the outcoupling sheet 20. The foregoing description of the first embodiment is equally applicable to the second embodiment, except for the differences described below.

In the second embodiment, the outcoupling sheet 20 is configured as a transmissive diffuser. Such a sheet 20 (also denoted "diffuser" in the following) is a non-imaging component that diffusely transmits a portion of the incoming propagating light, whereby at least part of the diffusively transmitted light reaches the light-sensing surface 3A. As is well-known to the skilled person, a non-imaging, diffusively transmitting surface will, when illuminated, emit light over a large solid angle at each location on the surface, as indicated by encircled rays 30 on the drawings. The diffuse transmission is governed by "scattering" (also known as a combination of "diffuse reflection" and "diffuse transmission") which refers to reflection, refraction and interference (diffraction) of light at a surface as well as by particles dispersed in the bulk beneath the surface, such that an incident ray is scattered at many angles rather than being reflected at just one angle as in "specular reflection" or "specular transmission". Thus, part of the propagating light (one ray shown in FIG. 4C) will be scattered by the diffuser 20, and a portion of this light will strike the light-sensing surface 3A of the detector 3. As is well-known to the skilled person, a "non-imaging" optical component is, in contrast to an imaging optical component, not designed with respect to the phase of the incoming light e.g. for the purpose of forming an image of a light source in a focal plane or generating a highly collimated beam of light, but is instead designed to achieve a dedicated optical radiative transfer of light from a source onto a target regardless of the phase of the light.

Accordingly, when illuminated by the propagating light, the diffuser 20 will act as a diffusive light source which is located in contact with the propagation channel inside the panel 1 to emit diffuse light. The diffusive light source thereby effectively defines the end point of one or more detection lines (propagation paths) across the panel 1. Since the diffuser 20 more or less randomly re-distributes the incoming light, the importance of precisely locating the light-sensing surface 3A with respect to the panel 1 is reduced. Thus, compared to conventional coupling elements (and the first embodiment), which operate by optical imaging, the sensitivity to manufacturing and mounting tolerances is reduced and assembly of the apparatus 100 is facilitated. This makes the apparatus 100 better suited for mass production. The diffuser 20 may be designed as a low cost component that adds little thickness and weight to the apparatus 100.

Although not shown in FIG. 4C, an angular filter may be installed intermediate the rear surface 6 and the sheet 20 in correspondence with the embodiment in FIG. 4B.

In the illustrated example, there is air between the sheet 20 and the light-sensing surface 3A. In an alternative embodiment, this space is filled by a solid light transmissive material, preferably a flexible material such as an adhesive, a gel or a silicon compound.

The diffuser 20 may emit the diffusively transmitted light with a main direction which is transverse to the plane of the panel, e.g. as indicated by the encircled rays 30 in the cross-section of FIG. 4C. The divergence of the diffusively transmitted light 30 (defined by the total angle between the off-axis angles where the luminous intensity is 50% of the on-axis value) is typically at least 40°, 60°, 80°, or 100°, in all directions. In one embodiment, the diffuser is near-Lambertian and yields a divergence of approximately 120° in all directions in the plane of the panel.

Figure 4D:
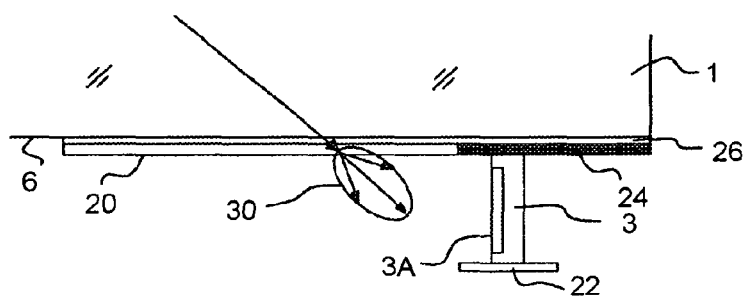
FIG. 4D is a section view of a variant of the second embodiment.

The diffuser 20 may be optimized, e.g. with respect to its thickness, structure, etc, to achieve a given relation between specular reflection and transmission, on one hand, and diffuse reflection and transmission, on the other hand. This relation may be expressed by a scatter fraction, which defines the fraction of light that is scattered (i.e. diffusely reflected and transmitted). The diffuser 20 may also be optimized to achieve a given relation between the diffusively reflected light that leaves the diffuser on the side facing away from the panel (i.e. the diffusively transmitted light) and the diffusively reflected light that leaves the diffuser 20 on the side facing the panel 1. This relation may be expressed by a "diffusive transmission ratio", given by diffuse transmission to diffuse reflection. Light that is specularly reflected by the diffuser 20 may result in outcoupling losses, and it is thus preferred that the scatter fraction is high for the diffuser 20. It is currently believed that reasonable performance may be achieved, at least for smaller touch surfaces, with a scatter fraction of at least 50%. Preferably, the scatter fraction is at least about 60%, 70%, 80%, 90%, 95%, or 99%. The diffusive transmission ratio will influence the impact that the main direction of the incoming light has on the main direction of the diffusively transmitted light. Generally, a low diffusive transmission ratio will cause the light, on a macroscopic scale, to be transmitted in a large solid angle at a given angle (typically at right angles) to the diffuser 20 irrespective of the angle of incidence of the propagating light on the other side of diffuser 20 (cf. the diffuse emission 30 in FIG. 4C). A high diffusive transmission ratio will instead cause the scattered light distribution to be more or less aligned with the direction of the incoming light. FIG. 4D illustrates a diffuser 20 with a high diffusive transmission ratio. As seen, such a diffuser 20 will direct a larger proportion of the diffuse emission 30 towards the light-sensitive surface 3A, since the propagating light falls onto the diffuser 20 at an angle which is at least equal to the critical angle $\theta_c$. The embodiment in FIG. 4D will suppress the impact of ambient light compared to the embodiment in FIG. 4C, since it promotes detection of light that strikes the diffuser 20 at a large angle to its normal. The diffuser in FIG. 4D may have a diffusive transmission ratio of more than 50%, 60%, 70%, 80% or 90%, depending on implementation.

In one embodiment, the diffuser 20 is configured without refracting structures. Such a diffuser 20 may be implemented as a film of diffusing particles in a simple, robust and cost effective manner. The film may be applied to the rear surface 6 by painting, spraying, lamination, gluing, etc. Any inherently translucent material may be used for forming the film, e.g. a matte white paint or ink. However, the paint may be optimized to obtain a desired diffusive transmission ratio, e.g. by including pigments (as well as paint vehicle) with a refractive index close to that of the panel 1 (in order to suppress refraction) or spherical objects of different materials with particle diameters close to half the wavelength of the light in order to promote forwards scattering (diffraction) by the particle. One such pigment is Silica, which has a refractive index n=1.45–1.5. There are many dedicated materials that are commercially available, e.g. the fluoropolymer Spectralon, barium-sulphate-based paints or solutions, granular PTFE, microporous polyester, Makrofol® polycarbonate films provided by the company Bayer AG, etc. Controlled bulk treatment such as generation of controlled patterns of micropores (e.g. by laser processing) may also be utilized to optimize scattering performance. Films or UV-coating layers with purposely added microbubble's of air may further be a cheap and efficient implementation of the diffuser 20.

In another embodiment, the diffuser 20 comprises refracting structures on the side facing the away from the rear surface 6. In such a diffuser, also known as an engineered diffuser, the refracting structures may be implemented as an arrangement (typically random or pseudo-random) of microstructures tailored to generate a desired diffuse transmission. Examples of engineered diffusers include diffractive diffusers, e.g. holographic diffusers, such as so-called LSD films provided by the company Luminit LLC. In a variant, the engineered diffuser is tailored to promote diffuse transmission into certain directions in the surrounding hemisphere, in particular to angles towards the light-sensing surface 3A (cf. FIG. 4D). The engineered diffuser may, in addition to the refractive structures, include diffusing particles. The engineered diffuser may be provided as a separate flat or sheet-like device 20 which is attached to the rear surface 6 (or the filter 26) e.g. by adhesive. Alternatively, the diffuser 20 may be provided in the rear surface 6 by etching, embossing, molding, abrasive blasting, etc.

Figure 5A:
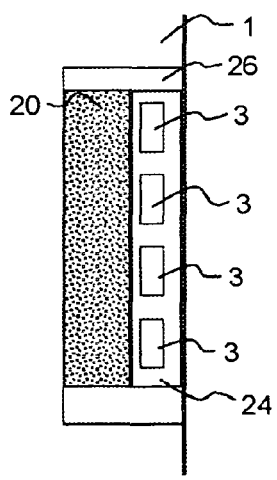
FIGS. 5A-5B are top plan views of exemplifying light outcoupling structures.
Figure 5B:
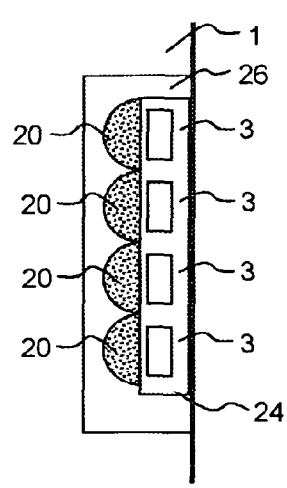

The outcoupling sheet 20 of the first and second embodiments may have a tailored shape on the panel 1. FIG. 5A is a top plan view of a portion of a panel 1 with an outcoupling sheet 20 configured as an elongate coherent strip. The detectors 3 are dispersed in a row along the sheet 20, with a spacing to its outer edge. The strip-shaped sheet 20 may allow the detectors 3 to be placed with any mutual spacing along the sheet 20, at least if the sheet 20 is a diffuser. The combination of the sheet 20 and a detector 3 defines an exit port on the panel 1. The ambient filter 24 is also configured as an elongate strip, which is arranged on the panel 1 to cover a surface portion around the detectors 3. The entire periphery region of the panel 1 is covered by the visibility filter 26 (here being transparent, for illustration purposes only). In FIG. 5B, the outcoupling sheet 20 is instead applied to the panel 1 in the form of spatially separated dots, and the detectors 3 are co-located with the respective dots. It should be understood that the dots may have any shape, e.g. semi-circular as in FIG. 5B or rectangular as in FIG. 2. The combination of a dot and a detector 3 defines an exit port on the panel 1. The use of dots provides well-defined locations of the exit ports on the panel 1.

2. Incoupling Structures

Figure 6A:
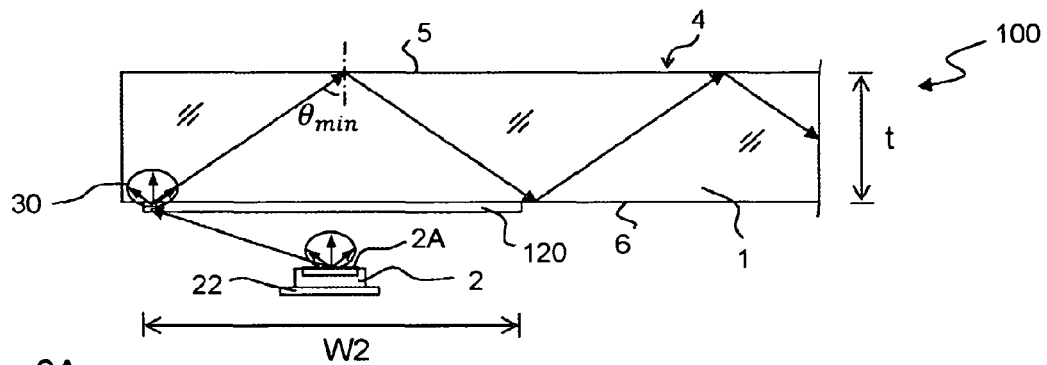
FIGS. 6A-6B are section views of light incoupling structures according to first and second embodiments.

FIG. 6A is a section view of a first embodiment of an incoupling structure. The incoupling structure includes an optical sheet ("incoupling sheet") 120 in the form of a diffuser, which may be identical to the above-described diffuser 20. In FIG. 6A, each emitter 2 has a confined light-emitting surface 2A which is arranged to face the rear surface 6, and the diffuser 120 is attached to the rear surface 6 next to the emitter 2 in the periphery region of the panel 1. In FIG. 6A, the emitter 2 is mounted on the PCB 22 to emit divergent or diffuse light from its top surface 2A towards the diffuser 120, and thereby the PCB 22 may be arranged flat along the rear surface 6.

The diffuser 120 is configured as a non-imaging component that diffusely transmits a portion of the incoming light into the panel 1, as indicated by encircled rays 30. Accordingly, when illuminated, the diffuser 120 will act as a diffusive light source which is located in contact with the propagation channel inside the panel 1 to emit diffuse light. The diffusive light source thereby effectively defines the actual origin of the detection lines that are generated by the light from the respective emitter 2. Accordingly, the combination of the emitter 2 and the diffuser 120 defines an entry port on the panel 1. Since the diffuser 120 more or less randomly re-distributes the incoming light, the importance of the luminance profile of the emitter 2 is reduced or even eliminated. This means that the diffuser 120 has the ability to act as a diffusive light source for many different types of emitters 2 and for many different relative orientations between the emitter 2 and the diffuser 120, as long as the light from the emitter 2 hits the diffuser 120 with a proper extent and at a proper location. Thus, compared to conventional coupling elements that operate by optical imaging, the sensitivity to manufacturing and mounting tolerances is reduced and assembly of the apparatus 100 is facilitated.

Similarly to the diffuser 20, the diffuser 120 will emit the transmitted light in a large solid angle into the panel 1, with a given divergence. It is realized that only the diffusively transmitted light rays that hit the front surface 5 at an angle equal to or larger than the critical angle $\theta_c$ will propagate by TIR. The critical angle $\theta_c$ is given by Snell's law and is well known to the skilled person. In the example of FIG. 6A, the critical angle of the panel 1 is $\theta_c = \arcsin(1/n_p)$, where $n_p$ is the index of refraction of the panel 1.

Similarly to the diffuser 20, the diffuser 120 may be optimized to achieve a high scatter fraction and a given diffusive transmission ratio. In the embodiment of FIG. 6A, it may be desirable to design the diffuser 120 with a low diffusive transmission ratio, i.e. a diffusive transmission ratio of less than 50%, 40%, 30%, 20% or 10%. The low diffusive transmission ratio will reduce the dependence on incoming light, and potentially increase the fraction of the transmitted light that enters the panel 1 at angles that sustain TIR. In an alternative, the diffuser 120 may be an engineered diffuser tailored to promote diffuse transmission into certain directions in the surrounding hemisphere, in particular to angles that sustain TIR propagation inside the panel 1.

The incoupling structure may be configured with respect to a minimum design angle $\theta_{min}$ for the light that propagates by TIR inside the panel 1. In other words, the incoupling structure may be optimized to generate propagating light that impinges on the front and rear surfaces 5, 6 at angles of $\theta_{min}$ or there above. The minimum design angle $\theta_{min}$ may be set equal to the critical angle $\theta_c$, or any angle above the critical angle $\theta_c$. In this optimization, the width W2 of the diffuser 120 may to be less than $2 \cdot t \cdot \tan(\theta_{min})$, which is the minimum design distance between consecutive bounces in the rear surface 6. This ensures that light transmitted by the diffuser 120 and impinging on the front surface 5 at $\theta_{min}$, or there above, will not be reflected back onto the diffuser 120.

Figure 6B:
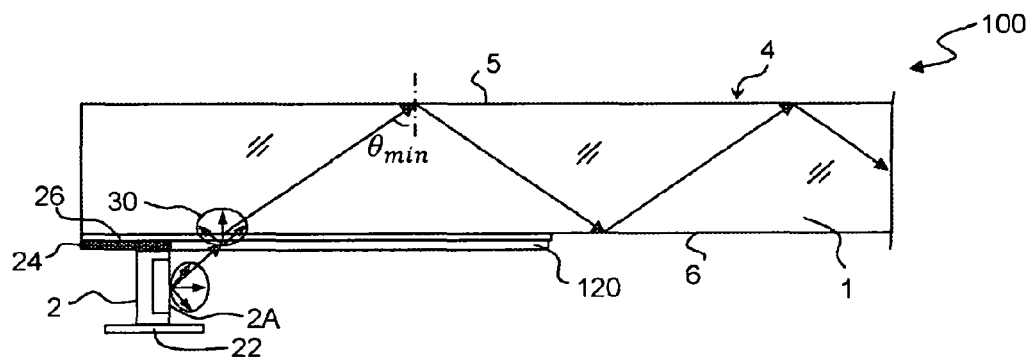

FIG. 6B illustrates a second embodiment of an incoupling structure. The second embodiment differs from the first embodiment by the orientation of the light-emitting surface 2A. The foregoing description of the first embodiment is equally applicable to the second embodiment, except for the differences described below.

Like in FIG. 6A, the emitter 2 is configured to emit a divergent or diffuse beam of light from its surface 2A. The surface 2A is arranged essentially perpendicular to the rear surface 6, such that the main direction of the emitted beam of light is essentially parallel to the rear surface 6. In FIG. 6B, the emitter 2 is side-emitting as mounted to the PCB 22. In an alternative, the emitter may be top-emitting and mounted to a PCB 22 that is arranged perpendicular to the rear surface 6. The embodiment in FIG. 6B enables the emitter to be located closer to the edge of the panel 1, which may be advantageous to free the space beneath the diffuser 120 for installation of other components, e.g. a mounting structure for a display or a lens element for modifying the distribution of light from the emitter 2 (e.g. to modify the injected energy on the different detection lines). Furthermore, as seen in FIG. 6B, the light from the emitter will strike the diffuser 120 at relatively large angles to the normal of the diffuser 120. Compared to FIG. 6A, the light that illuminates the diffuser 120 has a direction that more closely matches the desired direction of the light inside the panel (i.e. angles that sustain TIR propagation inside the panel 1). The diffuser 120 may be configured with a diffusive transmission ratio of more than 50%, 60%, 70%, 80% or 90% (cf. FIG. 4D), to enable a high incoupling efficiency. It is understood that the filters 24, 26 are optional.

In a variant, the diffuser in FIG. 6B is replaced by an incoupling sheet 120 in the form of a microstructured imaging component, similar to the one described with reference to FIG. 4A. The coupling of light into the panel 1 using such an incoupling sheet 120 may be greatly facilitated when the sheet 120 is illuminated by light that impinges at large angles to the normal of the sheet 120.

It should be noted that the incoupling sheet could have any of the shapes described above in relation to the outcoupling sheet, e.g. strip or spatially separated dots (semi-circular, rectangular, etc).

3. Combined Diffusive Coupling

It is to be understood that the apparatus 100 may implement the diffusive coupling technique only for outcoupling (or incoupling), while employing conventional coupling techniques for incoupling (or outcoupling), e.g. by large prisms as discussed in the Background section, by direct attachment to the front or rear surface, or by optical coupling via the edge surface. However, additional technical advantages are achieved by implementing the diffusive coupling technique for both incoupling and outcoupling (denoted "combined diffusive coupling" in the following). For one, the assembly of the apparatus 100 may be further facilitated and more suitable for mass production. Eliminating prisms may yield reductions in terms of cost, weight and height. Furthermore, the same (or a similar) diffuser may be used for both incoupling and outcoupling, and the impact of tolerances in the placement of the emitters and detectors with respect to the panel may be reduced.

Another technical advantage of combined diffusive coupling is that it enables simple optical coupling to the panel 1 of a sequence of electro-optical components (emitters 2, detectors 3, or both) that are arranged along one and the same side of the touch surface 4. Furthermore, it is possible to generate broad detection lines D, e.g. to cause the detection lines D of adjacent components 2, 3 to partly overlap, if desired. Still further, the components 2, 3 may be arranged in close proximity to each other beneath the panel 1, if desired, while achieving proper incoupling and outcoupling of light.

Figure 7:
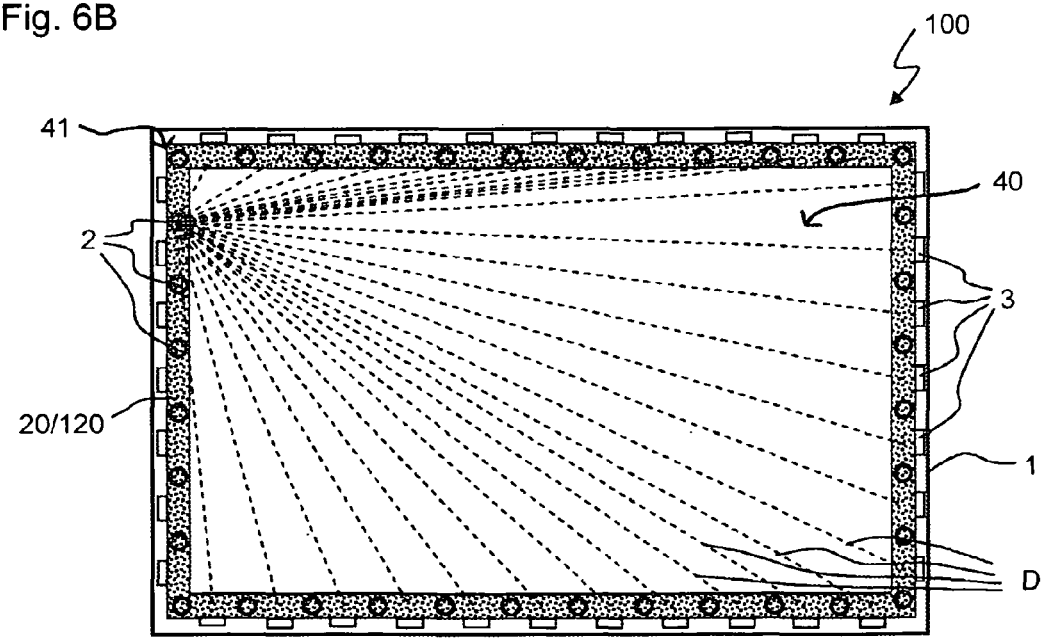
FIG. 7 is a top plan view of a touch-sensitive apparatus using a common concept for light incoupling and light outcoupling.
Figure 8:
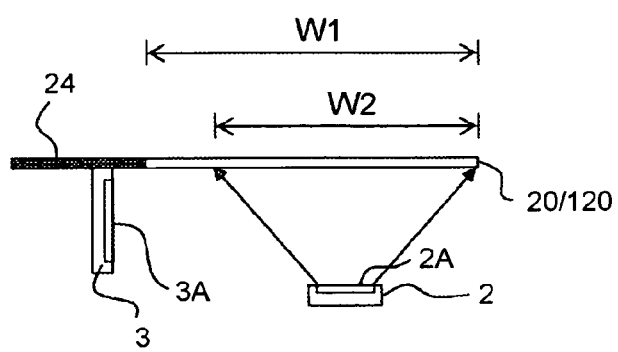
FIG. 8 is a side view of a detector and an emitter arranged at a common optical coupling sheet.

FIG. 7 is a top plan view of an apparatus that implements combined diffusive coupling based on the embodiments in FIG. 4C and FIG. 6A. The diffusers are implemented as a coherent strip of diffusively transmitting material that forms a frame around the center portion 40 of the panel 1. In FIG. 7, the strip is designated by 20/120. The emitters 2 and detectors 3 are arranged beneath the panel 1 in the periphery region 41. The emitters 2 are placed directly beneath the strip 20/120 with their light-emitting surfaces facing the strip (cf. FIG. 6A), and the detectors 3 are placed at the outer edge of the strip with their light-sensitive surfaces facing the center region 40 (cf. FIG. 4C). For the purpose of illustration, the emitters 2 and detectors 3 are made visible through the strip, and the filters 24, 26 have been omitted. The filters 24, 26 are suitably configured to define a respective frame around the center region 40. FIG. 7 also schematically indicates the detection lines D that are defined between one emitter 2 on one side of the panel and the detectors 3 on the other sides of the panel. The skilled person realizes that the width of the frame 20/120 in FIG. 7 may be selected as a compromise between the above-identified criteria for the widths W1, W2. The selection is a matter of routine experimentation to achieve reasonable efficiency both for incoupling and outcoupling of light. In an alternative, shown in a side view in FIG. 8, the strip has at least width W1 and the emitters 2 are arranged to project their beams onto the strip 20/120 such that the illuminated area on the strip has a maximum width W2 from the inner edge of the strip.

It is appreciated that the emitters 2 and detectors 3 may be placed in any order along the strip in FIG. 7. Furthermore, the strip may be replaced by a sequence of dots as illustrated in FIG. 5B.

In a further alternative, the incoupling structure in FIG. 7 is based on the second embodiment in FIG. 6B, by the emitters 2 being arranged with their light-emitting surfaces 2A perpendicular to the rear surface 6. In a specific implementation, the strip 20/120 has a high diffusive transmission ratio, which enables outcoupling with minimum influence of ambient light (cf. FIG. 4D) and incoupling with high efficiency.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the emitters 2 with vertical light-emitting surface 2A (FIG. 6B) and/or the detectors 3 with vertical light-sensing surface 3A (FIGS. 4A-4D) may be arranged outside the perimeter of the panel 1 so as to emit light onto the incoupling sheet and receive light from the outcoupling sheet, respectively.

Figure 10A:
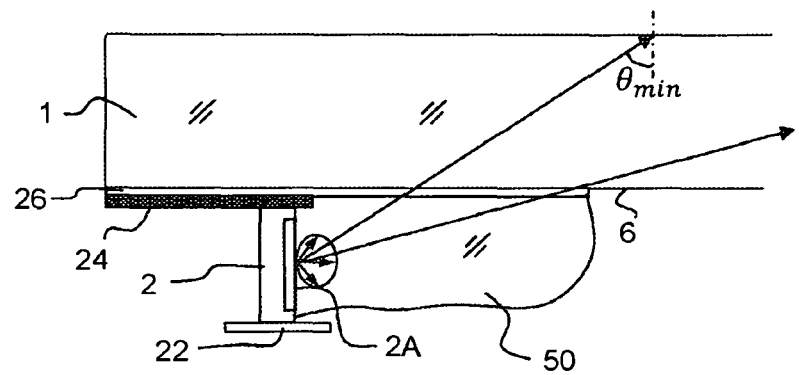
FIGS. 10A-10B are section views of an alternative structure for light incoupling and light outcoupling, respectively.
Figure 10B:
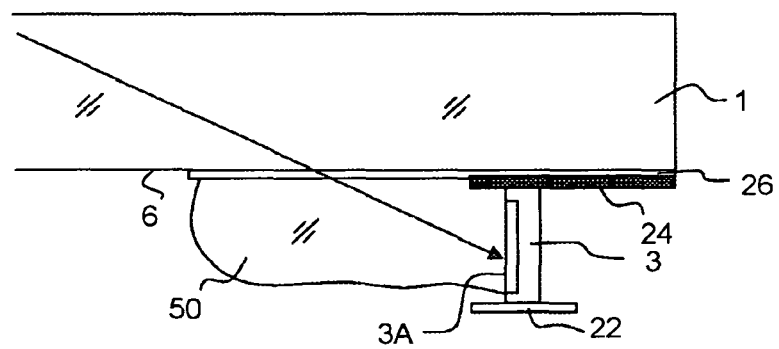

FIGS. 10A-10B illustrate alternative incoupling and outcoupling structures, which are implemented without the above-described incoupling and outcoupling sheets. Instead, a flexible material 50 is arranged to fill the space between the emitter/detector and the rear surface 6 (or the visibility filter 26, if present). The flexible material 50 is transmissive to the propagating light. In the incoupling structure, the flexible material 50 preferably has a refractive index that is matched to the refractive index of the panel 1 and the refractive index of the emitter 2 such that a desired portion of the emitted light enters the panel 1 at an angle of $\theta_{min}$ or there above. Similarly, in the outcoupling structure, the flexible material 50 preferably has a refractive index that is matched to the refractive index of the panel 1, such that a desired portion of the propagating light strikes the light-sensitive surface 3A. In the examples of FIGS. 10A-10B, the flexible material 50 has the same index of refraction as the panel 1. The flexible material 50 may be an adhesive, a gel or a silicon compound. Such a flexible material can be applied, e.g. as a blob or lump, in a simple operation and without requiring excessive precision during assembly of the apparatus. The result is a non-shaped structure, i.e. a structure with arbitrary shape, that allows the light to be coupled into and out the panel 1. The use of a flexible material 50 ensures durable bonds to the emitter/detector and to the rear surface 6 (or filter 26), e.g. to withstand shear stress caused by differences in thermal expansion between the material of the panel/filter/emitter/detector and the flexible material. Durable bonds may be important, since even a small or local detachment of the flexible material 50 may cause a significant decrease in coupling efficiency.

The invention claimed is:

1. A touch-sensitive aparatus, comprising:
   a light transmissive panel that defines a front surface and an opposite, rear surface, the light transmissive panel having a center region and a periphery region adjacent to the center region;
   light emitters, which are optically coupled to the light transmissive panel at entry ports along the periphery region, the light emitters configured to generate individual beams of light that diverge in a plane of the light transmissive panel while propagating inside the light transmissive panel, from the entry ports and into the center region, by internal reflections between the front and rear surfaces;
   light detectors, which are optically coupled to the light transmissive panel, the light detectors configured to detect light transmitted inside the light transmissive panel at exit ports along the periphery region; and
   at least one sheet-like optical element on the rear surface in the periphery region;
   wherein the at least one sheet-like optical element is configured to couple light propagating in the light transmissive panel by internal reflections, to the light detectors;
   wherein the light detectors are arranged at said at least one sheet-like optical element to receive, on a respective light-sensitive surface, light from the at least one sheet-like optical element;

wherein each of the light detectors is arranged with the light-sensitive surface substantially perpendicular to the rear surface; and wherein said at least one sheet-like optical element includes micro-structures that define an imaging optical element, the imaging optical element configured to at least one of transmit and re-direct light that impinges thereon from inside the light transmissive panel.

2. The aparatus of claim 1, wherein each of the light detectors is displaced from the at least one sheet-like optical element in a direction away from the center region, so as to be arranged without overlap between the at least one sheet-like optical element and the light detector.

3. The aparatus of claim 1, wherein
each of the light detectors is arranged beneath the light transmissive panel;
a light shield is arranged at the rear surface in the periphery region; and
the light shield is configured block light in at least a wavelength range of the beams of light.

4. The aparatus of claim 1, wherein
the beams of light include light in an infrared wavelength region;
the aparatus further includes a visibility shield arranged between the rear surface and said at least one sheet-like optical element; and
the visibility shield is configured to block light that is visible to a human eye, and to transmit light in the infrared wavelength region.

5. The aparatus of claim 1, wherein said at least one sheet-like optical element further comprises:
a diffractive layer with micro-structures of varying refractive indices.

6. The aparatus of claim 1, further comprising:
an angular filter between the rear surface and the at least one sheet-like optical element.

7. The aparatus of claim 1, wherein said at least one sheet-like optical element further includes a non-imaging component, the non-imaging component configured to diffusely transmit light that impinges thereon from inside the light transmissive panel.

8. The aparatus of claim 7, wherein said at least one sheet-like optical element comprises:
at least one elongate strip of diffusively transmitting material.

9. The aparatus of claim 7, wherein
said at least one sheet-like optical element is configured to exhibit at least 50% diffuse emission.

10. The aparatus of claim 9, wherein said at least one sheet-like optical element is configured to exhibit at least 90% diffuse emission.

11. The aparatus of claim 7, wherein said at least one sheet-like optical element is configured to exhibit at least 50% transmission of diffuse emission.

12. The aparatus of claim 1, wherein
each of the light detectors is configured to receive light that has propagated by total internal reflection across the center region from a plurality of the entry ports;
each of the light detectors is configured to receive the light from a portion of said at least one sheet-like optical element, said portion having an extent on the light transmissive panel, in directions towards the plurality of the entry ports, of at least $2 \cdot t \cdot \tan(\theta_{min})$;
t is a distance between the front and rear surfaces; and
$\theta_{min}$ is an angle larger than or equal to a critical angle $\theta_c$ of the light transmissive panel.

13. The aparatus of claim 1, wherein the light emitters are configured to emit light onto said at least one sheet-like optical element to define the entry ports, and to generate the beams of light that propagate inside the light transmissive panel by diffuse transmission.

14. The aparatus of claim 13, wherein each of the light emitters is configured to emit diverging light with a main direction that is substantially parallel to the rear surface.

15. The aparatus of claim 13, wherein
each of the light emitters is configured to provide light for propagation by total internal reflection across the center region to a plurality of the exit ports;
each of the light emitters is configured to illuminate a portion of said at least one sheet-like optical element, said portion having an extent on the light transmissive panel, in directions towards the plurality of the exit ports, of at most $2 \cdot t \cdot \tan(\theta_{min})$;
t is a distance between the front and rear surfaces; and
($\theta_{min}$) is an angle larger than or equal to a critical angle $\theta_c$ of the light transmissive panel.

16. The aparatus of claim 1, wherein said at least one sheet-like optical element defines a continuous frame in surrounding relationship to the center region.

17. The aparatus of claim 1, wherein the light detectors are side-detecting components mounted on a mounting surface of one or more printed- circuit boards that are arranged with the mounting surface facing and extending in parallel with the rear surface of the light transmissive panel.

18. A touch-sensitive aparatus, comprising:
a light transmissive panel that defines a front surface and an opposite, rear surface, the light transmissive panel having a center region and a periphery region adjacent to the center region;
light emitters, which are optically coupled to the light transmissive panel at entry ports along the periphery region, the light emitters configured to generate individual beams of light that diverge in a plane of the light transmissive panel while propagating inside the light transmissive panel, from the entry ports and into the center region, by internal reflections between the front and rear surfaces;
light detectors, which are optically coupled to the light transmissive panel, the light detectors configured to detect light transmitted inside the light transmissive panel at exit ports along the periphery region; and
at least one sheet-like optical element on the rear surface in the periphery region;
wherein the light detectors are arranged at said at least one sheet-like optical element to receive, on a respective light-sensitive surface, light from the at least one sheet-like optical element;
wherein each of the light detectors is arranged with the light-sensitive surface substantially perpendicular to the rear surface;
wherein each of the light detectors is arranged beneath the light transmissive panel;
wherein a light shield is arranged at the rear surface in the periphery region;
wherein the light shield is configured to block light in at least a wavelength range of the beams of light; and
wherein the light shield is on the rear surface adjacent to said at least one sheet-like optical element in the periphery region.

19. The aparatus of claim 1, wherein each of the light detectors is arranged beneath the light transmissive panel.

20. The aparatus of claim 19, wherein each of the light detectors is arranged beneath the light transmissive panel within the periphery region.

21. The aparatus of claim 19, wherein each of the light detectors is arranged entirely beneath the light transmissive panel.

22. A touch-sensitive aparatus, comprising:
a light transmissive panel that defines a front surface and an opposite, rear surface, the light transmissive panel having a center region and a periphery region adjacent to the center region;
light emitters, which are optically coupled to the light transmissive panel at entry ports along the periphery region, the light emitters configured to generate individual beams of light that diverge in a plane of the light transmissive panel while propagating inside the light transmissive panel, from the entry ports and into the center region, by internal reflections between the front and rear surfaces; and
light detectors, which are optically coupled to the light transmissive panel, the light detectors configured to detect light transmitted inside the light transmissive panel at exit ports along the periphery region;
wherein at least one sheet-like optical element is on the rear surface in the periphery region;
wherein each of the light emitters is arranged at said at least one sheet-like optical element to emit diverging light with a main direction that is substantially parallel to the rear surface such that a portion of the diverging light impinges on said at least one sheet-like optical element to define a respective entry port; and
wherein said at least one sheet-like optical element includes micro-structures that define an imaging optical element, the imaging optical element configured to at least one of transmit and re-direct said portion of the diverging light that impinges thereon.

23. The aparatus of claim 22, wherein said at least one sheet-like optical element further includes a non-imaging component, the non-imaging component configured to diffusely transmit said portion of the diverging light that impinges thereon.

* * * * *